(12) United States Patent
Stucchi et al.

(10) Patent No.: US 9,494,248 B2
(45) Date of Patent: Nov. 15, 2016

(54) ELECTRICALLY ACTUATED VALVE HAVING TWO WAYS AND THREE POSITIONS

(71) Applicant: C.R.F. Societa Consortile per Azioni, Orbassano (Torino) (IT)

(72) Inventors: Sergio Stucchi, Valenzano (IT); Raffaele Ricco, Casamassima (IT); Onofrio De Michele, Castellana Grotte (IT); Marcello Gargano, Torre a Mare (IT); Domenico Lepore, Cassamassima (IT)

(73) Assignee: C.R.F. Societá Consortile per Azioni, Orbassano (Torino) (IT)

( * ) Notice: Subject to any disclaimer, the term of this patent is extended or adjusted under 35 U.S.C. 154(b) by 53 days.

(21) Appl. No.: 14/334,881

(22) Filed: Jul. 18, 2014

(65) Prior Publication Data
US 2015/0034193 A1   Feb. 5, 2015

(30) Foreign Application Priority Data

Aug. 1, 2013 (EP) .................................. 13178875

(51) Int. Cl.
| | |
|---|---|
| F16K 31/06 | (2006.01) |
| F16K 11/07 | (2006.01) |
| F16K 31/00 | (2006.01) |
| F16K 1/52 | (2006.01) |

(52) U.S. Cl.
CPC ............. *F16K 31/0613* (2013.01); *F16K 1/52* (2013.01); *F16K 11/0716* (2013.01); *F16K 31/004* (2013.01); *F16K 31/0655* (2013.01); *Y10T 137/8671* (2015.04)

(58) Field of Classification Search
CPC .......... F16K 31/0613; F16K 31/0655; F16K 31/0658; F16K 31/0668; F16K 31/0675; F16K 31/0686; F15B 13/0442; Y10T 137/8671; Y10T 137/86614; Y10T 137/867

USPC ............. 251/30.02, 129.02, 129.07, 129.08; 137/625.17, 625.69
See application file for complete search history.

(56) References Cited

U.S. PATENT DOCUMENTS

| | | | | |
|---|---|---|---|---|
| 4,627,596 A | * | 12/1986 | Busacchi | F02M 3/075 251/129.07 |
| 5,441,232 A | | 8/1995 | Tanaka | |
| 6,029,682 A | * | 2/2000 | Lewis | F02M 63/0017 137/1 |

(Continued)

FOREIGN PATENT DOCUMENTS

| | | |
|---|---|---|
| DE | 3422214 A1 | 12/1984 |
| DE | 3700356 A1 | 7/1988 |

OTHER PUBLICATIONS

European Search Report for corresponding European Application No. 13178875.4, dated Jan. 16, 2014 completed Jan. 9, 2014.

*Primary Examiner* — Matthew W Jellett
(74) *Attorney, Agent, or Firm* — Heslin Rothenberg Farley & Mesiti P.C.; Victor A. Cardona, Esq.

(57) ABSTRACT

An electrically actuated valve includes a first working way and a second working way and a poppet configured for providing a seal on a valve seat set hydraulically between the first working way and the second working way. The poppet includes a first operating position, a second operating position, and a third operating position, and is displaceable by an electrical-actuation device In the first operating position, a passage area for a hydraulic fluid defined between said valve seat and said poppet has a maximum value In the second operating position, the passage area is partialized and has a value lower than said maximum value In the third operating position, the poppet is in contact with the valve seat, and the passage area has a substantially zero value, so that the first working way is isolated from the second working way.

14 Claims, 6 Drawing Sheets

(56) References Cited

U.S. PATENT DOCUMENTS

| | | |
|---|---|---|
| 6,240,907 B1 | 6/2001 | Schwarz |
| 6,945,508 B2 * | 9/2005 | Lewis ................ F02M 63/0017 251/129.02 |
| 7,069,951 B2 * | 7/2006 | Cornea ..................... F01L 1/34 137/625.65 |
| 2012/0292546 A1 * | 11/2012 | Wheatley ............... B65D 83/48 251/186 |

* cited by examiner

ELECTRICALLY ACTUATED VALVE HAVING TWO WAYS AND THREE POSITIONS

CROSS REFERENCE TO RELATED APPLICATIONS

This application claims priority from European Patent Application No. 13178875.4 filed on Aug. 1, 2013, the entire disclosure of which is incorporated herein by reference.

FIELD OF THE INVENTION

The present invention relates to electrically actuated valves, in particular to electrically actuated valves of the poppet type.

PRIOR ART

The prior art provides numerous examples of electrically actuated valves built using slide-valve technology and having two power ways and three operating positions of the slide valve that provide as many modalities of connection between the power ways. However, for some types of application slide-valve technology is not compatible with the requirements in terms of overall dimensions and performance established in the design stage, which—in general—makes necessary the choice of electrically actuated valves with open/close-element technology.

However, the latter type of valves has, as compared to slide valves, a lower flexibility as regards the modalities of connection of the power ways, and in general their operation is limited to just two operating positions of the poppet (open and closed). This is equivalent to a modulation of the flow that passes from one working way to another substantially between the maximum value and the zero value.

In some applications, however, it may be required to carry out a modulation of the flow that passes from one power way to the other, for example, in the case where the hydraulic system in which the electrically actuated valve is inserted is sized in such a way that the maximum flow that passes between the two working ways is required only in particularly burdensome conditions of operation, whereas in normal conditions a decidedly lower flow is required.

OBJECT OF THE INVENTION

The object of the invention is to overcome the technical problems mentioned previously. In particular, the object of the invention is to provide an electrically actuated valve where a modulation between the maximum and zero values of the flow rate of fluid that passes between the power ways is possible.

SUMMARY OF THE INVENTION

The object of the invention is achieved by an electrically actuated valve having the characteristics forming the subject of one or more of the ensuing claims, which form an integral part of the technical disclosure provided herein in relation to the invention.

In particular, the object of the invention is achieved by an electrically actuated valve including a first working way and a second working way and a poppet configured for providing a seal on a valve seat set hydraulically between the first and second working ways, the poppet including a first operating position, a second operating position, and a third operating position and being movable by means of an electrical-actuation device, wherein:
in the first operating position, an passage area for the fluid defined between said valve seat and said poppet has a maximum value;
in the second operating position said passage area is partialized and has a value lower than said maximum value; and
in the third operating position said poppet is in contact with said valve seat, and the passage area has a substantially zero value so that the first working way is isolated from the second working way,
wherein moreover:
the poppet is movable from the first operating position to the second operating position by means of a first electrical command imparted to said electrical-actuation device against the resisting action of a first elastic element; and
the poppet is movable from the second operating position to the third operating position by means of a second electrical command imparted to said electrical-actuation device against the resisting action of said first elastic element and of a second elastic element.

BRIEF DESCRIPTION OF THE FIGURES

The invention will now be described with reference to the annexed figures, which are provided purely by way of non-limiting example and wherein.

DETAILED DESCRIPTION OF PREFERRED EMBODIMENTS

Figure 1:
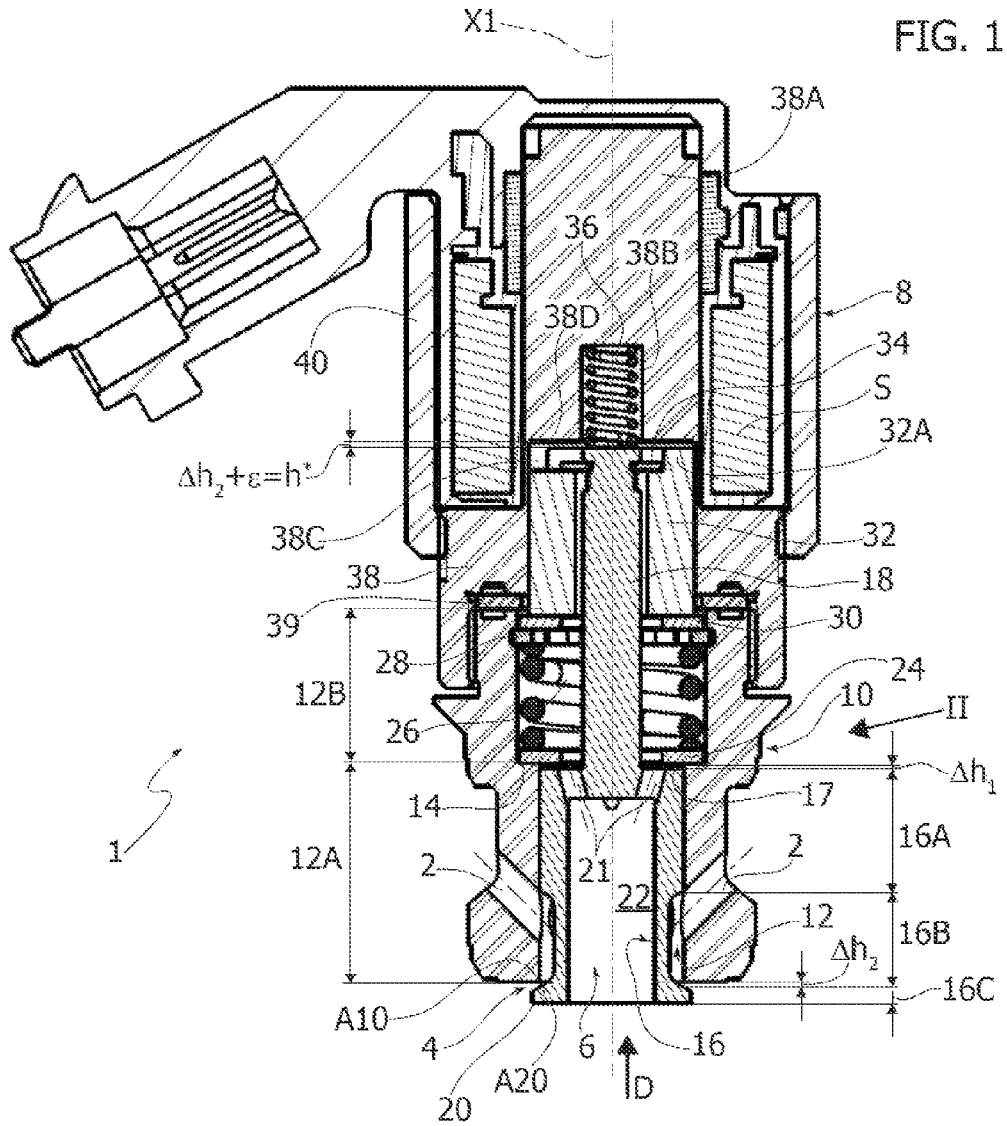
FIG. 1 is a cross-sectional view of an electrically actuated valve according to a preferred embodiment of the invention.

In FIG. 1, the reference number 1 designates as a whole an electrically actuated valve according to a preferred embodiment of the invention.

Figure 1A:
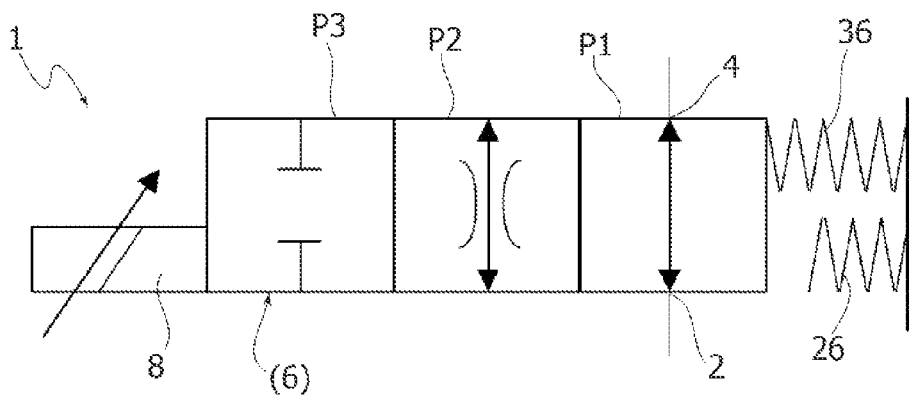
FIG. 1A is a schematic circuit representation of the valve of FIG. 1.

With reference to FIGS. 1 and 1A, the valve 1 includes a first working way 2, a second working way 4, a poppet 6 configured for governing hydraulic communication between the ways 2 and 4, and an electromagnet 8 configured for actuation of the poppet 6 along an axis X1 of the valve 1.

With reference to FIG. 1, the valve 1 includes a sleeve 10 having a substantially cylindrical tubular shape, provided on which are the working ways 2, 4 and within which the poppet 6 is mounted axially mobile. In particular, the way 2 takes the form of a ring of radial holes having an axis incident to the axis X1 and inclined with respect thereto, whereas the way 4 is defined by the outlet of an axial through hole 12, which is coaxial to the axis X1 and includes a first stretch 12A having a diameter smaller than that of a second stretch 12B so as to define a shoulder 14 at the interface thereof.

The poppet 6 includes a head 16 having a hollow cylindrical shape, and a shank 18 integral with the head 16 and having a diameter smaller than that of the latter in such a way as to define a shoulder 17 at the interface between them.

Figure 2:
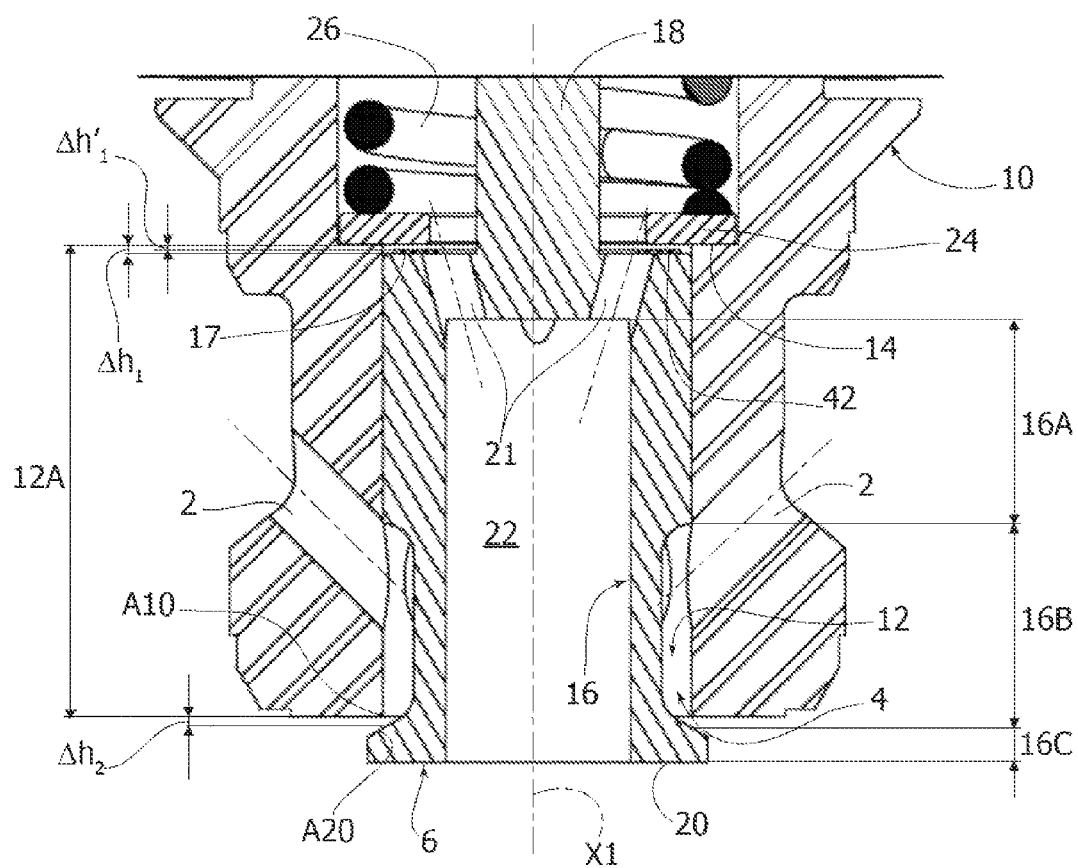
FIG. 2 is an enlarged cross-sectional view according to the arrow II of FIG. 1.
Figure 3:
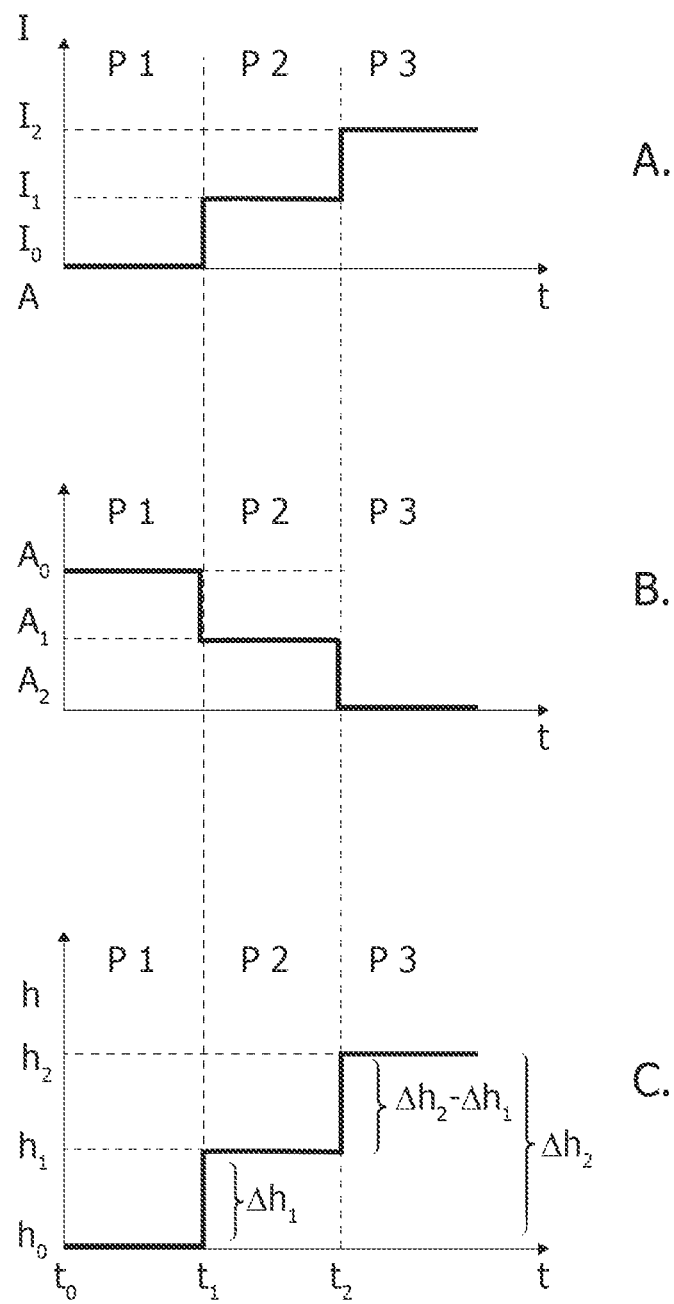
FIG. 3 consists of a section A, a section B, and a section C each illustrating a time plot, respectively, of a current for actuation of the valve of FIG. 1, an passage area between the ways of the valve of FIG. 1, and a travel of an poppet of the valve.
Figure 4:
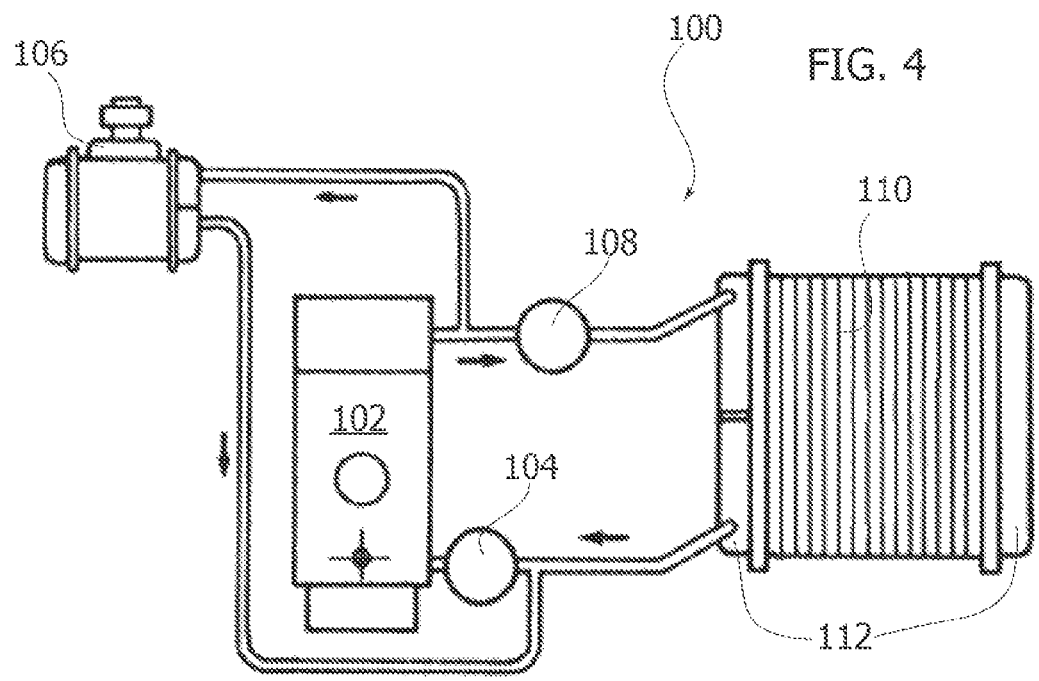
FIG. 4 and FIG. 5 illustrate a preferred application of the valve according to the invention, in particular a cooling circuit for an internal-combustion engine, represented without (FIG. 4) and with (FIG. 5) the valve according to the invention.
Figure 5:
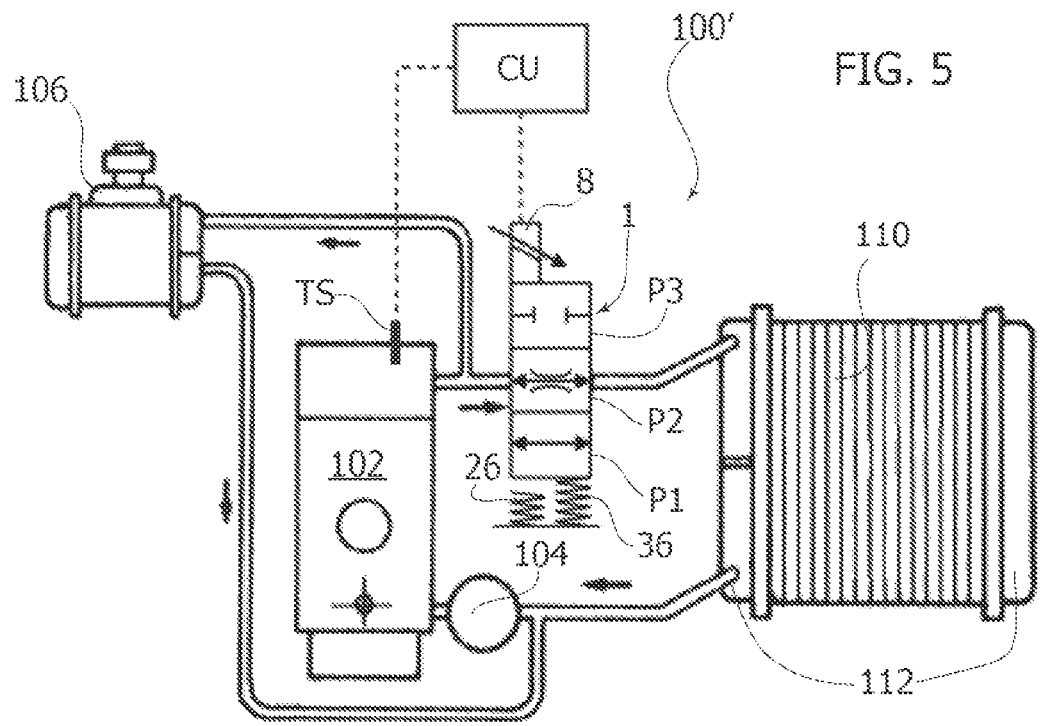
Figure 6:
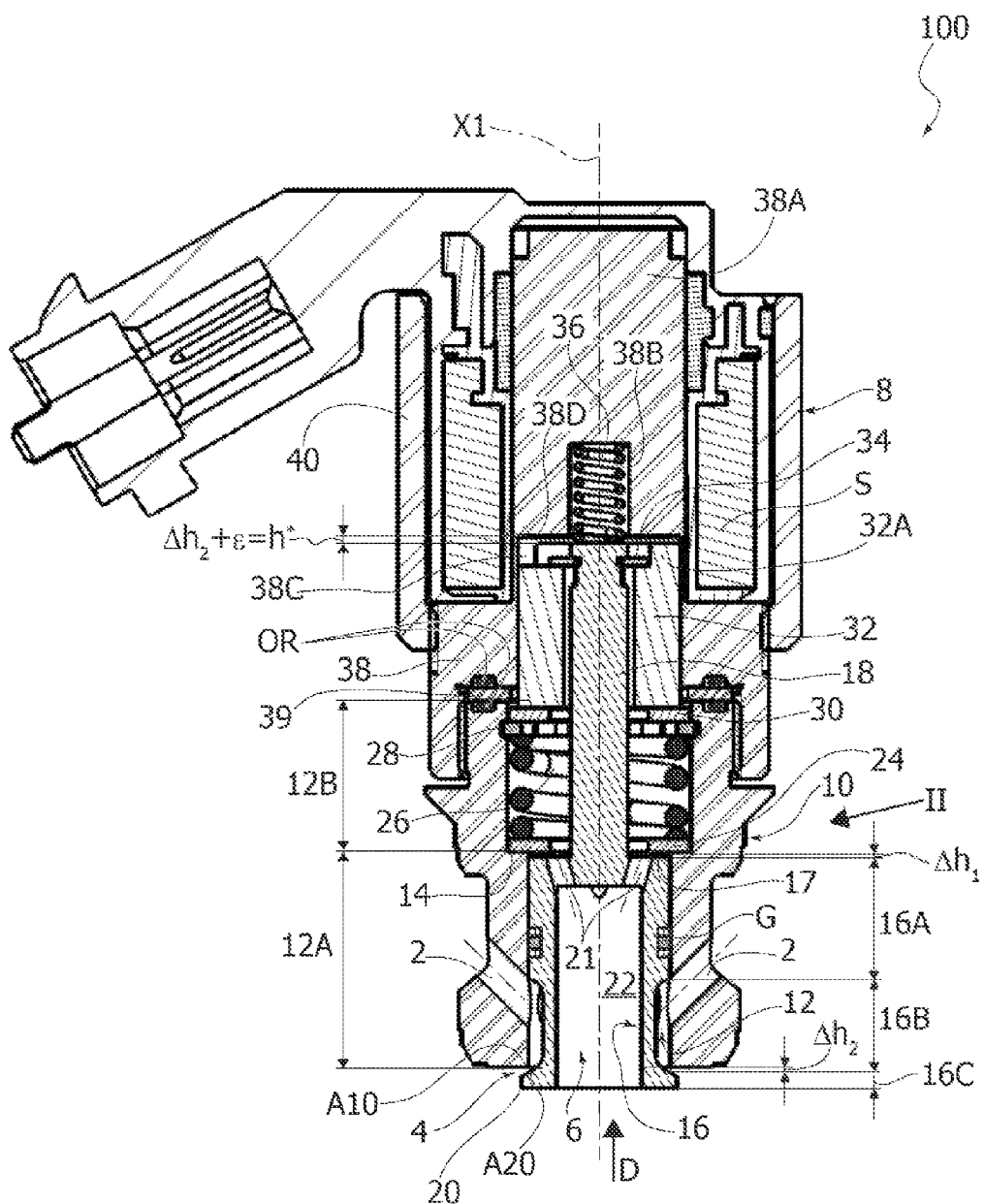
FIG. 6 illustrates a variant of the valve of FIG. 1, in particular devised for use with gaseous fluids.
Figure 7:
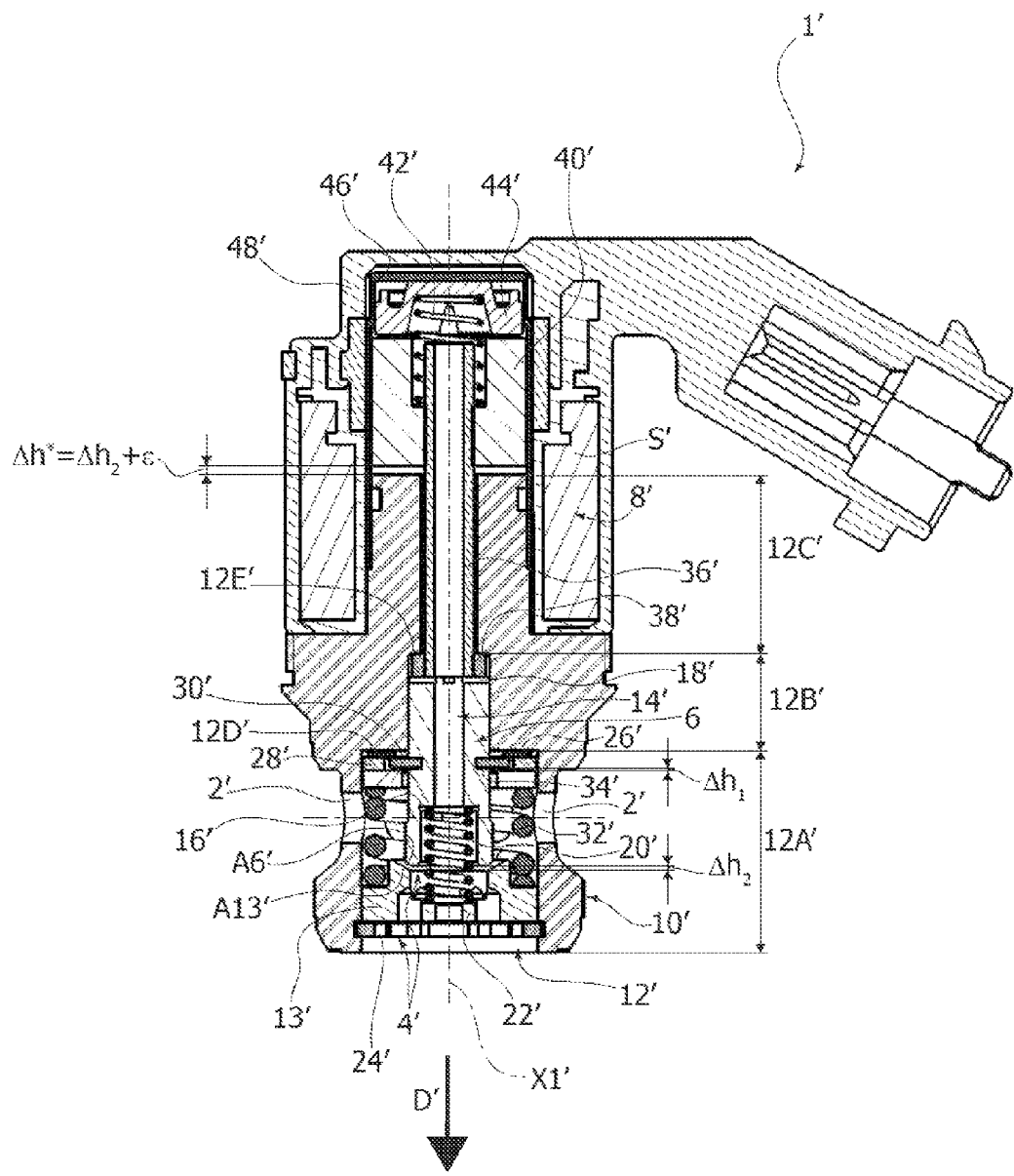
FIG. 7 illustrates a valve according to a further preferred embodiment of the invention.

The head 16 further comprises three stretches, namely:

FIG. 1 is a cross-sectional view of an electrically actuated valve according to a preferred embodiment of the invention;

FIG. 1A is a schematic circuit representation of the valve of FIG. 1;

FIG. 2 is an enlarged cross-sectional view according to the arrow II of FIG. 1;

FIG. 3 consists of a section A, a section B, and a section C each illustrating a time plot, respectively, of a current for actuation of the valve of FIG. 1, an passage area between the ways of the valve of FIG. 1, and a travel of an poppet of the valve;

FIG. 4 and FIG. 5 illustrate a preferred application of the valve according to the invention, in particular a cooling circuit for an internal-combustion engine, represented without (FIG. 4) and with (FIG. 5) the valve according to the invention;

FIG. 6 illustrates a variant of the valve of FIG. 1, in particular devised for use with gaseous fluids; and FIG. 7 illustrates a valve according to a further preferred embodiment of the invention.

DETAILED DESCRIPTION OF PREFERRED EMBODIMENTS

Provided in the shoulder 17 is a ring of through holes 21 with axis incident on the axis X1 and inclined with respect thereto. The holes 21 give out onto a cavity 22 having a cylindrical shape provided within the head 16, thus setting it in communication with the stretch 12B of the hole 12.

Set in abutment on the shoulder 14 within the stretch 12B is a first spacer ring 24, whereon an elastic contrast element 26—in turn—abuts, preferentially a cylindrical helical spring. Set at an opposite end of the elastic element 26, abutting thereon, is a positioning retaining ring 28 (with prevalently radial deformability, preferably of Seeger type), which is axially fixed and whereon—in turn—a second spacer ring 30 abuts. The thickness of the ring 24 enables adjustment of the axial pre-load of the elastic element 26.

Finally, abutting on the spacer ring is an anchor 32 of the electromagnet 8, which moreover abuts on a retaining ring 34 housed in a groove of the shank 18. The retaining ring 34 hence creates an axial constraint between the anchor 32 and the poppet 6.

Abutting on the end of the shank 18 is a further elastic contrast element 36, preferentially a cylindrical helical spring having a coil diameter smaller than that of the elastic element 26. The elastic element 36 is housed in a seat made in a ring nut 38, in particular in a shank 38A thereof. Slidably set therein is the anchor 32, which surrounds the shank 18. In greater detail, in the embodiment illustrated herein, the elastic element 36 is housed in a terminal blind hole 38B of the aforesaid cavity, whereas the anchor 32 is slidably set in a stretch 38C that terminates in a shoulder 38D in a position corresponding to the hole 38B.

The ring nut 38 is screwed on the sleeve 10 where it gives out onto the outside of the stretch 12B of the hole 12. Set between the ring nut 38 and the sleeve 10 is a further spacer ring designated by the reference number 39 in FIG. 1.

A solenoid S of the electromagnet is moreover fitted around the shank 38A and is surrounded by a further ring nut 40 screwed on the ring nut 38. The ring nut 40 is made of a material with high ferromagnetic properties and completes the magnetic circuit of the electromagnet. All the components described above are mounted coaxially, sharing the axis X1.

Operation of the valve 1 is described in what follows.

With reference to FIG. 1 and to FIG. 2, the poppet 6 is configured for providing a seal via the conical surface A20 on the edge A10 that defines a valve seat set hydraulically between the first working way 2 and the second working way 4 and configured for governing hydraulic communication between them. The poppet 6 can be moved via the electromagnet 8 and is able to assume a first operating position, a second operating position, and a third operating position.

In the ensuing functional description, the elastic element 36 will be identified as "first elastic element", whilst the elastic element 26 will be identified as "second elastic element".

The first operating position of the poppet 6 is illustrated in FIGS. 1, 1A (schematically) and 2. The first operating position corresponds to a resting condition of the valve 1 and is characterized by the absence of electrical signal at input to the solenoid S. This implies the substantial absence of electromagnetic force on the anchor 32. In this way, the anchor 32 is kept in abutment on the ring 30 thanks to the action of the first elastic element 36 on the shank 18, which via the retaining ring 34 transfers said action onto the anchor 32. The retaining ring 28 provides an abutment that the ring 30 cannot overstep, thus fixing the position of the poppet 6 in the first operating position.

At the same time, the spacer ring 24 is kept in abutment on the shoulder 14 by the second elastic element 26. There moreover follows from this that each of the elastic elements 26, 36 is mounted so as to have a predetermined axial pre-load (i.e., it is mounted so as to have a non-zero deflection at rest).

In the first operating position, the position of the poppet 6 with respect to the sleeve 10 is such that there is:

a first axial play $\Delta h_1$ (FIG. 2) between the head 16 (in particular, the shoulder 17) and the spacer ring 24; and a second axial play $\Delta h_2$ (greater than $\Delta h_1$) between the stretch 16C of the head 16, in particular the conical surface A20 and the sleeve 10, in particular the edge A10.

Thanks to this position of the poppet 6, in the first operating position, the passage area defined between the edge A10 and the conical surface A20 (which corresponds to the passage area that the fluid that passes from the way 2 to the way 4, and vice versa, must traverse) has a maximum value.

The poppet 6 can be moved from the first operating position (illustrated in FIGS. 1, 1A, 2) to a second operating position by means of a first electrical command imparted to the electromagnet 8, in particular a current that is supplied to the solenoid S. This results in the development of an electromagnetic force that attracts the anchor 32, causing a displacement (by drawing) of the poppet 6 against the resisting action of the first elastic element 36, basically consisting of the axial pre-load assigned thereto (the proportional contribution due to deformation—given by the product of the stiffness by the deflection—has little impact considering how small the axial displacement of the end of the element 36 is). The transmission force in an axial direction is possible thanks to the retaining ring 34.

The value of current that is supplied to the solenoid S is such as to cause a displacement of the poppet 6 along the axis X1 in a direction indicated by the arrow D in FIG. 1. This enables coverage of an axial travel equal to $\Delta h_1$ and makes it possible to bring the head 16 of the poppet 6 to abut on the spacer ring 24, thus annulling the axial play $\Delta h_1$ existing in the valve 1. It should be noted that the assignment of a predetermined axial pre-load to the elastic element 36 (the same applies to the second elastic element 26, as will be seen) enables unique determination of the value of the excitation current of the solenoid S, which is chosen so as to develop a force of attraction on the anchor 32 that will overcome the value of axial force corresponding to the aforesaid pre-load.

The axial travel of the poppet 6 stops against the spacer ring 24 in so far as the value of current supplied to the solenoid S is sufficient only to overcome the resisting action of the first elastic element 36 but is not able to overcome a resisting action by an amount equal to the sum of the contributions of elastic force (basically equal to the respective axial pre-loads) of the first and second elastic elements 36, 26. The continuation of the axial travel of the poppet 6 in the direction D would entail also the compression of the element 26, as will on the other hand be described shortly with regard to the transition from the second operating position to the third operating position of the poppet 6.

It should be noted in fact that the two elastic elements, when they are both active in determining the mechanical equilibrium of the system, are set mechanically in parallel since they undergo the same deformation: the displacement of the shank 18 that compresses the element 36 is the same that the head 16 undergoes, the shoulder 17 of which draws the ring 24 within the stretch 12B of the hole 12 compressing the elastic element 26 (the other end of the element 26 is axially fixed in so far as it abuts on the retaining ring 28). In these circumstances, as is known, the equivalent stiffness of the ensemble of elastic elements is equal to the sum of the two contributions.

In the second operating position of the poppet 6, the passage area between the ways 2 and 4 is partialized and assumes a value lower than the maximum value. Basically, in the second operating position, a partialization of the passage area between the ways 2 and 4 is introduced, with consequent modulation of the flow of fluid that passes from the way 2 to the way 4.

Transition from the second operating position to the third operating position of the poppet 6 is obtained by imparting a second electrical command to the electromagnet 8 by means of supply to the solenoid S of a current of intensity higher than the current imparted in the transition from the first operating position to the second operating position.

This results in a force of attraction on the anchor 32 having an even greater magnitude and in particular such as to move further the poppet 6 with respect to the position assumed at the end of the transition from the first operating position to the second operating position, overcoming the combined reaction (i.e., the sum of the two axial pre-loads) of the first and second elastic elements 36, 26. The head 16 of the poppet 6 is hence able to draw the ring 24 axially, compressing the elastic element 26. The travel of the poppet 6 stops when the residual axial play between the flange 20 and the sleeve 10, which is equal to an amount $\Delta h_2 - \Delta h_1$, is eliminated.

This is equivalent to bringing the conical surface A20 to abut on the valve seat A10, which results in bringing the passage area between the way 2 and the way 4 to a substantially zero value so that the first way 2 is isolated from the second way 4, and vice versa (there is in fact allowed a passage of fluid in both directions within the valve 1).

Also in this case, assignment of a predetermined axial pre-load to the second elastic element 26 enables a unique choice of the value of the excitation current that it is necessary to impart on the solenoid S to move the poppet from the second operating position to the third operating position.

A summary of the variation of the conditions of the valve 1 that occur in the transition between the various operating positions 6 is provided by FIG. 3; namely:

the diagram of FIG. 3A illustrates the time plot of the current supplied to the solenoid S (excitation current); the current (on the ordinates) is designated by the symbol I, the time (on the abscissae) by the symbol t;

the diagram of FIG. 3B illustrates the time plot of the passage area between the ways 2 and 4; the area (on the ordinates) is designated by the symbol A, the time (on the abscissae) by the symbol t;

the diagram of FIG. 3C illustrates the time plot of the axial travel of the poppet 6; the travel (on the ordinates) is designated by the symbol h, the time (on the abscissae) by the symbol t.

All the diagrams have the same zero-time reference so that the evolution described by each of them is simultaneous with the evolution described by the other two.

The axis of the abscissae is divided into three intervals P1, P2, P3, associated, respectively, to the first operating position, to the second operating position, and to the third operating position of the poppet 6. This being said, from the diagrams of FIG. 3, the following may be noted:

i) in the time interval P1, the poppet is in the first operating position so that the excitation current of the solenoid S assumes a zero value $I_0$, the passage area between the ways 2 and 4 assumes a maximum value $A_0$, and the axial travel of the poppet 6 has a zero value $h_0$ (defining in this way the position reference for the poppet 6);

ii) in the interval P2, the poppet 6 is in the second operating position: the excitation current of the solenoid S assumes a value $I_1$ other than zero and consequently greater than the value $I_0$, the passage area between the ways 2 and 4 drops to the value $A_1$, lower than the value $A_0$, whilst the axial travel covered by the poppet 6 (during transition from the first operating position to the second operating position) is equal to $h_1$ (which is in turn equal to the amount $\Delta h_1$);

iii) in the interval P3, the poppet 6 is in the third operating position: the excitation current of the solenoid S assumes a value $I_2$ greater than the value $I_1$, the passage area between the ways 2 and 4 goes to zero assuming the zero value $A_2$, whilst the axial travel covered by the poppet 6 during the transition from the first operating position to the second operating position is equal to the amount $\Delta h_2 - \Delta h_1$; the overall travel covered by the poppet 6 in the transition from the first operating position to the third operating position is hence equal to the value $h_2$ (which is in turn equal to the amount $\Delta h_2$).

In this connection, further brief considerations are called for regarding the relative positioning of the various components of the valve 1.

The axial play $\Delta h_2$ is established, once the dimensions of the poppet 6 and of the anchor 32 are fixed, by means of the spacer ring 30: this abuts upon the retaining ring 28, which is axially fixed and consequently provides a position reference. The thickness of the ring 30 hence determines the position of the flange 20 with respect to the sleeve 10: in fact, it determines in the first place the distance of the anchor 32 with respect to the retaining ring 28, and given the axial constraint existing between the anchor 32 and the shank 18, this will also determine the position of the poppet 6 with respect to the ring 28. Since moreover the latter is axially fixed with respect to the sleeve 10, it is evident that determining the position of the poppet 6 with respect to the retaining ring 28 is equivalent to determining also the position thereof with respect to the sleeve 10, i.e., in the final analysis, the play $\Delta h_2$ (maximum travel of the poppet 6).

The axial play $\Delta h_1$ is instead established by means of the geometry of the poppet 6, in particular the axial length of the head 16 and the axial distance of the groove where the ring 34 is housed with respect to the shoulder 17. The axial play $\Delta h_1$ determines the amount of partialization of the passage area between the ways 2 and 4 that is obtained in the transition from the first operating position to the second operating position. It should moreover be noted, with reference to FIG. 2, that the axial play $\Delta h_1$ can undergo fine adjustment—if the requirements of the application so impose—to bring it to values smaller than those determined in the design stage by addition of a ring with calibrated thickness, designated by the reference number 42, thus bringing it to the value $\Delta h_1' < \Delta h_1$.

Finally, the spacer ring 39 enables adjustment of a further axial play, designated by the reference $\Delta h^*$, equal to the sum of the play $\Delta h_2$ and of an additional amount $\epsilon$ that enables compensation of the effects due to the machining tolerances. The axial play $\Delta h^*$ corresponds to the maximum travel of the anchor 32 and is measured between the top end of the anchor 32 (as viewed in the drawing in FIG. 1; in any case, it is the end of the anchor 32 not in contact with the ring 30 and—in this embodiment—provided with a crescent-shaped axial projection designated by the reference number 32A) and the shoulder 38D. The thickness of the ring 39 determines the distance of the shoulder 38D from the margin (the top one—end of the stretch 12B—and the bottom one—edge A10) of the sleeve 10 and must be chosen so as to result in a play $\Delta h^* > \Delta h_2$ in so far as it is necessary for the anchor 32 to be able to cover an axial travel greater than that of the poppet 6. In fact, if the maximum axial travels of the poppet 6 and of the anchor 32 were chosen identical, there could arise situations of incomplete closing of the valve 1. For example, on the hypothesis of identical nominal maximum axial travels, in the case where the machining tolerances on the head of the poppet 6 were to result in a play $\Delta h_2$ greater than the nominal one, in the presence, instead, of a play between the anchor 32 and the shoulder 38D equal to the nominal value, the anchor 32 would come into contact with the shoulder 38 long before there were created a contact between the surface A20 and the edge A10, which would prevent closing of the valve 1.

Instead, the choice of a value of the amount $\epsilon$ such as to cover the entire range of deviations with respect to the nominal values of the dimensions of the components established in the design stage makes it possible to bring the valve 1 to close in any condition.

It should moreover be noted that, during operation, the pressure of the hydraulic fluid across the valve 1, i.e., the one the pressure that is exerted on the way 2 and on the way 4, has no substantial effect on the movement of the poppet 6.

The reason for this is that, thanks to the holes 21, there always exists the same value of pressure upstream and downstream of the head 16: the holes 21 create a shortcircuit between the environment on which the way 4 gives out and the stretch 12B of the hole 12. Also the volume where the shank 18 of the poppet 6 terminates, defined between the top of the anchor 32 and the shoulder 38D of the ring nut 38 is in fluid communication with the portion 12B by means of appropriate areas of passage for the fluid defined by the radial play between the shank 18 and the anchor 32. In other words, the poppet 6 is hydraulically balanced along the axis X1: this guarantees that the movement of the poppet 6 depends only upon the value of excitation current supplied to the solenoid S.

The term "hydraulically balanced" referred to the poppet 6 is intended to indicate that the resultant in an axial direction (i.e., along the axis X1) of the forces of pressure acting on the poppet is zero. This is due to the choice of the surfaces of influence, exerted on which is the action of the pressurized fluid, and of the diameter of dynamic seal (in this case, also guide diameters) of the poppet 6.

In particular, the diameter of dynamic seal of the poppet 6 is the diameter of the stretch 12A, which is identical to the diameter of the head 16 at the shoulder 17, which moreover corresponds to the diameter on which the conical surface A20 provides the seal on the valve seat A10.

With reference to FIGS. 4 and 5, there now follows a description of an advantageous application of the electrically actuated valve 1 according to the invention.

FIG. 4 is a schematic illustration of a cooling circuit for an internal-combustion engine of a motor vehicle. The cooling circuit is designated as a whole by the reference 100 and includes an internal-combustion engine 102, a circulation pump 104, an expansion vessel 106, a thermostat 108, and a radiator 110 equipped with two heads 112.

The circulation pump 104 has an inlet port in hydraulic communication with one of the heads 112 and with a return channel from the expansion vessel 106. As regards the direction of flow of the fluid in the system, see the arrows indicated at the margin of the hydraulic channels in FIG. 4.

The delivery of the pump 104 is, instead, directly connected to the inlet of the internal cooling circuit of the internal-combustion engine 102. The outlet of the cooling circuit of the internal-combustion engine 102 is in hydraulic communication with a channel leading to the expansion vessel 106 and with the thermostat 108, which is located on a hydraulic line leading to the head 112. Also connected to the same head 112 is the inlet port of the pump 104.

The thermostat 108 is a device sensitive to the variation in temperature across it and, in the case of a cooling circuit of an automotive type, it governs a thermostatic valve by modulating the section of passage thereof as a function, in fact, of the aforesaid difference in temperature.

In particular, the thermostat 108 is configured for enabling hydraulic communication between the radiator 110 and the internal-combustion engine 102 only in the case where the temperature of the coolant that flows within the engine 102 has reached a threshold value. The reason for this is to guarantee a heating of the engine 102 that is as fast as possible so as to reduce consumption levels, emissions, and wear of the components.

As long as the temperature of the coolant remains below the above threshold value (in current automobiles, approximately 95° C.) the coolant recirculates in the cooling circuit inside the engine 102 without traversing the radiator 110. Once the threshold value of the temperature of the coolant has been reached, the thermostat 108 causes a gradual opening of the thermostatic valve governed thereby allowing passage of coolant towards the radiator 110, thus preventing a rise in temperature to values incompatible with proper operation of the engine. The degree of opening of the thermostatic valve depends in general upon many factors, for example the power generated by the engine (which determines the amount of losses of a thermal nature), the flow of air that impinges upon the radiator, and the temperature of the air in the external environment.

The entire process of regulation the passage area is of an exclusively thermomechanical type, since the only element of the cooling circuit on which it is possible to act via an electronic control unit is a cooling fan installed on the radiator 10 (not represented in FIGS. 4 and 5, but in itself known).

There may, however, arise certain operating conditions in which the action of the thermostat 108 alone is not sufficient to guarantee an optimal temperature of the coolant entering the internal cooling circuit of the engine 102. In these conditions, the risk of thermal shock on the head of the engine 102 is very high.

One of such operating conditions is sudden arrest of the vehicle after it has covered a stretch of road in which the engine has been running in conditions of maximum load, with a high power demand and in any case such as to produce major thermal losses.

Sudden arrest of the vehicle causes the air flow that impinges on the radiator 110 to cease instantaneously, generating an equally sudden rise in the mean temperature of the coolant. The dynamics of the process of rise in temperature is generally faster than the dynamics that characterizes opening of the thermostatic valve governed by the thermostat 108 so that there will exist a time interval where the engine is supplied with coolant at a temperature decidedly higher than the one that it had during movement of the vehicle, i.e., at the moment when a large flow of air impinged upon the radiator. At times, it may happen that the temperature of the air outside is so high as to render insufficient even intervention of the cooling fan installed on the radiator itself, with consequent massive rise in temperature.

In order to overcome the above problem (see FIG. 5), it is preferable to replace the thermostat 108 and the thermostatic valve controlled thereby with the electrically actuated valve 1 according to the invention. The electrically actuated valve 1 is controlled by a control unit CU of an electronic type operatively connected to the electromagnet 8 and to a temperature sensor TS configured for detecting the temperature of the coolant that flows in the internal cooling circuit of the internal-combustion engine 102, in particular in a head thereof. In this way, thanks to the electronic management of the valve 1 it is possible to reproduce completely the behaviour of the thermostat 108 under normal operating conditions; namely, as long as the temperature of the coolant inside the engine 102 is below a predetermined threshold, the valve 1 is kept in the third operating position P3 where the ways 2 and 4 are isolated from one another;

when the threshold value of the temperature of the coolant is reached, the valve 1 is switched into the second operating position (partialized passage area, flowrate at intermediate values) and possibly into the first operating position (maximum passage area, flowrate at the maximum value) in the case where the demand for removal of heat were to so impose.

When the critical conditions referred to above arise, switching of the valve 1 into the first operating position, which corresponds to the maximum passage area between the ways 2 and 4, may be obtained at a speed decidedly higher than the rate of rise in temperature due to the sudden reduction to zero of the flow of air on the radiator 110.

The reason for this is that, thanks to the sensor TS, the control unit CU immediately senses the rise in temperature of the coolant in the cylinder head of the engine 102 and can govern switching of the valve 1 in a practically instantaneous way. This prevents any thermal shock on the cylinder head of the engine 102 and moreover enables modalities of management of the flow of the coolant that are substantially impossible to obtain with a thermomechanical system such as the thermostat 108.

Of course, the details of construction and the embodiments may vary widely with respect to what has been described and illustrated herein, without thereby departing from the scope of the present invention, as defined by the annexed claims.

In particular, as anticipated, in alternative embodiments the electromagnet 8 may be replaced by a piezoelectric linear actuator or by a magnetostrictive linear actuator, both of which may be controlled electrically.

In the preferred embodiment forming the subject of the figures, the poppet 6 is countered in its movement along the axis X1 by a first elastic element and a second elastic element having stiffnesses preferentially different from one another. However, the two elastic elements 26, 36 may be sized so as to have identical stiffnesses, which, on the hypothesis of an electromagnet with linear behaviour, would enable amplitudes of current $I_2$ and $I_1$ to be obtained, where one is twice the other.

Of course, it possible to choose the stiffnesses in a different way, for example the stiffness of the element 26 greater than the stiffness of the element 36, or vice versa.

In other embodiments, it is possible to replace the ensemble of the two elastic elements with a single equivalent elastic element having a nonlinear characteristic. This would be equivalent to sizing the single elastic element so that a deformation thereof from the condition at rest equal to $\Delta h_1$ is characterized by a first value of stiffness to deformation, whereas a subsequent deformation of amplitude $\Delta h_2 - \Delta h_1$ is characterized by a stiffness to deformation greater than the first stiffness so as to reproduce equivalently the mechanical parallel of the elastic elements 26, 36 that characterizes the valve 1.

With reference to FIG. 6, a variant of the valve of FIG. 1 is designated by the reference number 100. All the components identical to those already described are designated by the same reference numbers. The valve 100 is altogether identical to the valve 1, except for the provision of a pair of elastomeric annular gaskets of the O-ring type designated by the reference OR astride of the spacer ring 39 (one in the ring nut 38, and the other in the sleeve 10) and of a low-friction annular gasket G (made of PTFE—Teflon® or Turcite) on the head 16 of the poppet 6, which provides a dynamic seal between the poppet 6 and the sleeve 10.

Provision of the gaskets referred to above enables use of the valve 100 with a gaseous working fluid. This is not generally viable with the valve 1 since, in the absence of the gaskets OR and G, gas leakages would arise that would jeopardize proper operation of the system. In the valve 1—which is designed specifically for operation with a working fluid in the liquid state—the seals are of a dynamic type and are created by the meatuses of liquid in the radial plays between poppet 6 and the sleeve 10 (basically along the stretch 12A). Any possible leakage of liquid at the interface between the ring nut 39 and the sleeve 10 in the valve 1 may be simply sent on to a draining environment, which is not viable if the working fluid is a gas. For the rest, operation of the valve 100 is altogether identical to that of the valve 1. It is in any case understood that the variant illustrated in FIG. 6 may be used also with liquid working fluids, specifically in the case where any possible leakage (consumption) of the working fluid is undesirable.

With reference now to FIG. 7, the reference number 1' designates as a whole an electrically actuated valve according to a preferred embodiment of the invention.

The valve 1' includes a first working way 2', a second working way 4', an poppet 6' configured for governing hydraulic communication between the ways 2', and 4', and an electromagnet 8' configured for actuation of the poppet 6' along an axis X1' of the valve 1'.

The valve 1' includes a sleeve 10' having a substantially cylindrical tubular shape, provided on which are the working ways 2', 4' and mounted axially movable in which is the poppet 6'. In particular, the way 2' takes the form of a ring of radial holes having an axis incident to the axis X1', whilst the way 4' is defined by the outlet of an axial through hole 12', which shares the axis X1'. In particular, the outlet is obtained through a bushing 13' defined on which is a valve seat A13 having a conical shape on which the poppet 6' can provide a seal.

The hole 12' includes a first stretch 12A' having a first diameter, a second stretch 12B' having a second diameter, and a third stretch 12C' having a third diameter. The third diameter is smaller than the second diameter, which in turn is smaller than the first diameter, so as to define two shoulders 12D', 12E'.

The poppet 6' has a generally tubular cylindrical shape and is slidably mounted within the hole 12, guided by the stretch 12B' (with respect to which it has an identical diameter—but for the clearance necessary for operation) and projecting within the stretch 12A'.

The poppet 6' is traversed by an axial through hole 14' having two distinct diameters along its axial development so as to define a shoulder 16'. One end 18' of the poppet 6' located at the outlet of the stretch with smaller diameter of the hole 14' has a castellated geometry, whilst at the opposite end a first elastic element 20' is received in the hole 14' with an end abutting on the shoulder 16'. The second end of the elastic element 20' instead abuts on a hub 22' of the bushing 13'. The axial position of the bushing 13' is determined via a retaining ring (of the Seeger type) 24' housed in an annular groove of the sleeve 10' and by the axial position of this annular groove.

Moreover housed within the stretch 12A' of the hole 12 are:
a first spacer ring 26', set abutting on the shoulder 12D;
a second spacer ring 28' abutting on the ring 26' and having an internal diameter greater than the internal diameter of the ring 26;
a third spacer ring 30' abutting on the ring 28' and having an internal diameter smaller than the internal diameter of the ring 28' and preferentially approximately equal to the internal diameter of the ring 26; and
a second elastic element 32' having a first end that abuts upon the ring 30' (thus compressing the pack of the rings 26', 28', 30') and a second end that abuts upon the bushing 13', in particular on a collar thereof.

A retaining ring 34' is housed in an annular groove on the body of the poppet 6', and is axially movable with the poppet 6' in the region comprised between the rings 30' and 26'. It should be noted that for this purpose it is necessary for the external diameter of the retaining ring 34' to be smaller than the internal diameter of the ring 28'.

A sleeve element 36' is slidably set in the stretch 12C' of the hole 12' and is guided thereby; one end of the sleeve element 36' abuts upon the castellated end 18', whilst an adjustment ring 38' is fitted around the aforesaid end of the sleeve element 36' and abuts on the shoulder 12E' and the castellated end 18'.

In this way, two axial plays $\Delta h_1$ and $\Delta h_2$ are defined between the poppet and other components of the valve 1; namely,
the play $\Delta h_1$ is defined between the retaining ring 34' and the spacer ring 30' (in this regard, note that it is possible that a small axial play be also between the retaining ring 34' and the retaining ring 26'); and
the play $\Delta h_2$ is defined between a sealing surface A6' with conical geometry located at the end of the poppet 6 facing the bushing 13' and the valve seat A13', which also has a conical geometry, and has a width greater than the play $\Delta h_1$.

In this connection, it should be noted that the play $\Delta h_2$ (maximum travel of the poppet 6') is defined via the thickness of the collar-adjustment ring 38', of course having defined the geometry of the poppet 6' and of the bushing 13', and the axial positions of the shoulder 12E' and of the seat of the retaining ring 24'.

The axial play $\Delta h_1$ is, instead, defined by the overall thickness of the rings 26' and 30'. The axial pre-load of the elastic element 32' is, instead, defined by the overall thickness of the rings 26'. 28' and 30'.

Fixed, instead, for example by means of force fitting, to an opposite end of the sleeve element 36' is an anchor 40' of the electromagnet 8', which can be moved axially along the axis X1 by means of a solenoid S' of the electromagnet 8'. The axial stability of the system is ensured by an elastic positioning element designated by the reference number 42', which is comprised between the anchor 40' and a retainer 44', which in turn abuts upon the bottom of a cup element 46' fitted on the sleeve 10'. In particular the elastic element 42', by acting on the anchor 40', keeps the sleeve element 36' abutting upon the castellated end 18'.

The electromagnet 8' has a substantially toroidal shape and is fitted on the sleeve 10' substantially in a position corresponding to the cup element 46; it is moreover enclosed in a body 48' in which the electrical connections that carry the current to the solenoid S' are provided.

Finally, it should be noted that in the resting position of the poppet 6' represented in FIG. 7 there exists an axial play $\Delta h^*$ equal to $\Delta h_2+\epsilon$ between the anchor 40' and the sleeve 10, the function of which is to compensate for any possible machining tolerances on the components of the valve 1 and guarantee in any case proper sealing of the poppet 6' on the valve seat A13', in a way similar to what has already been described (with the use of similar notation) in regard to the valve 1'. The amount of the axial play $\Delta h^*$ is defined by the axial position where the forced connection (or welding) between the anchor 40' and the sleeve element 36' is obtained. As an alternative, there could be interposed a further adjustment shim, not shown in FIG. 7, between the bottom surface of the anchor 40' and the surface of the ring nut 18'.

Operation the valve 1' is described in what follows.

With reference to FIG. 7, the poppet 6' is configured for providing a seal via the surface A6 on the valve seat A13' set hydraulically between the first working way 2' and the second working way 4' and configured for governing hydraulic communication between them. The poppet 6' can be moved via the electromagnet 8' and is able to assume a first operating position, a second operating position, and a third operating position.

The first operating position of the poppet 6' is illustrated in FIG. 7 and (schematically) in FIG. 1A (position P1). The first operating position corresponds to a resting condition of the valve 1' and is characterized by the absence of electrical signal at input to the solenoid S'. This implies the substantial absence of electromagnetic force on the anchor 40', which in turn implies the following facts:

the castellated end 18' of the poppet 6' is kept in abutment on the adjustment ring 38; it should be noted in this connection that the function of the castellated geometry on the end 18' is to reduce the force of adhesion between the poppet 6' and the ring 38' caused by the film of fluid that remains trapped between the two facing surfaces;

between the ring 34' and the ring 30' there exists the axial play $\Delta h_1$;

between the surface A6' and the valve seat A13' there exists the axial play $\Delta h_2$;

the passage area between the ways 2' and 4' has a maximum value.

In a way similar to the valve 1, the poppet 6' can be moved from the first operating position illustrated in FIG. 7 to a second operating position by means of a first electrical command imparted to the electromagnet 8', in particular a current that is supplied to the solenoid S'. This results in the development of an electromagnetic force that attracts the anchor 40', causing a displacement (via an action of thrust and not of pull as, instead, occurs in the valve 1) of the poppet 6' against the resisting action the first elastic element 20'. The transmission of force in the axial direction is possible thanks to the contact between the sleeve element 36' (which basically functions as transmission rod) and the castellated end 18' of the poppet 6'.

The value of current that is supplied to the solenoid S' is such as to cause a displacement of the poppet 6' along the axis X1' in a direction indicated by the arrow D' in FIG. 7. This enables an axial travel equal to $\Delta h_1$ to be covered and makes it possible to bring the retaining ring 34' to abut on the spacer ring 30', thus eliminating the axial play $\Delta h_1$ existing in the valve 1'.

The axial travel of the poppet 6' stops against the spacer ring 30' in so far as the value of current supplied to the solenoid S' is chosen so as to be sufficient only to overcome the resisting action the first elastic element 20', but not to overcome a resisting action by an amount equal to the sum of the contributions of force of the first and second elastic elements 20', 32', corresponding to the respective axial pre-loads. Also in this case—as in the valve 1, 100—the elastic elements 20', 32' are mounted so as to have a non-zero deflection at rest and hence likewise a non-zero axial pre-load. The reasons are, evidently, the same as the ones already described in regard to the valve 1. The continuation of the axial travel of the poppet 6 in the direction D' would also entail the compression of the element 32', as will on the other hand be described shortly in regard to the transition of the poppet 6' from the second operating position to the third operating position.

As for the valve 1, the two elastic elements, when they are both active in determining the mechanical equilibrium of the system, are set mechanically in parallel since they undergo the same deformation. The displacement of the poppet 6' that compresses the element 20' is the same that the retaining ring 34' undergoes when it moves the ring 30' compressing the elastic element 32' (the other end of the element 32' is axially fixed in so far as it abuts only upon the bushing 13').

In these circumstances, as is known, the equivalent stiffness of the ensemble of elastic elements is equal to the sum of the two contributions.

In the second operating position of the poppet 6', the passage area between the ways 2' and 4' is partialized and assumes a value lower than the maximum value.

Basically, in the second operating position a partialization of the passage area between the ways 2' and 4' is introduced, with consequent modulation of the flow rate of fluid that passes from the way 2' to the way 4'.

Transition of the poppet 6' from the second operating position to the third operating position is obtained by imparting a second electrical command to the electromagnet 8' by supplying to the solenoid S' a current having a higher intensity than the current imparted in the transition from the first operating position to the second operating position.

This results in a force of attraction on the anchor 40' having a magnitude that is even greater and in particular such as to move the poppet 6' beyond the position assumed at the end of the transition from the first operating position to the second operating position, overcoming the combined stiffness of the first and second elastic elements 20', 32'. The retaining ring 34 is hence able to draw the ring 30' in the axial direction, thus compressing the elastic element 32'. The travel of the poppet 6' stops when the residual axial play between the surface A6' and the seat A13', equal to an amount $\Delta h_2 - \Delta h_1$, is eliminated.

This is equivalent to bringing the surface A6' to abut on the valve seat A13', which has the result of bringing the passage area between the way 2' and the way 4' to a substantially zero value so that the first way 2' is isolated from the second way 4' and vice versa (there is in fact allowed a passage of fluid in both directions within the valve 1').

The functional analogy between the two valves 1 and 1' is hence evident; namely, in the first operating position of the poppet, there is a first axial play $\Delta h_1$ between a first contrast surface of the poppet (the shoulder 17 in the valve 1, the ring 34' in the valve 1') and a second contrast surface, exerted upon which is the action of the second elastic element (the ring 24 for the valve 1, the ring 30' for the valve 1'), and a second axial play $\Delta h_2$ between the poppet 6; 6' and the valve seat A10, A13', with $\Delta h_2 > \Delta h_1$;

in the second operating position of the poppet 6, 6', the first axial play $\Delta h_1$ is overridden; and in the third operating position of the poppet 6, 6', also the second axial play $\Delta h_2$ is overridden.

The analogy clearly also extends to the electrical-actuation device (whatever it is, without being limited to the electromagnet forming the subject of the figures); i.e., a moving element (for example, the anchor 32, 40' in the valves 1, 100, 1') of the electrical-actuation device 8, 8' has a maximum axial travel $\Delta h^*$ chosen so as to be greater than the value of the second axial play $\Delta h_2$ for the reasons set forth above.

For the valve 1' there hence applies what is summarized in the diagrams of FIGS. 3A-C with regard to the valve 1.

It should moreover be noted that, during operation, the pressure of the hydraulic fluid across the valve 1', i.e., the pressure on the way 2' and the pressure on the way 4', has no substantial effect on the movement of the poppet 6'.

The reason for this is that, thanks to the through hole 14', there always exists the same pressure value upstream and downstream of the poppet 6': the hole 14' creates a shortcircuit between the environment onto which the way 4 gives out and the environment where the castellated end 18' is located (amongst other things, the shape of the end 18' is functional for penetration of the working fluid).

Furthermore, the axial through hole of the sleeve 36' and the shape of the anchor 40', which has axial notches, enable the fluid to be at the same pressure both in the volume defined between the castellated end 18' and the adjustment ring 38' and in the volume that houses the anchor 40'.

In other words, the poppet 6 is hydraulically balanced (there applies the same definition provided previously) along the axis X1': this guarantees that the movement of the poppet 6' depends only upon the value of excitation current supplied to the solenoid S'.

This is due to the choice of the surfaces of influence on which the action of the pressurized fluid is exerted and of the diameter of dynamic seal (in this case, also guide diameters) of the poppet 6'.

In particular, the diameter of dynamic seal of the poppet 6' is the diameter of the stretch 12B', which is identical to the diameter of the poppet at the castellated end 18', which moreover corresponds to the diameter on which the surface A6' provides the seal on the valve seat A13'.

Of course, also the valve 1' may be applied, as a replacement of the thermostat 108 (and of the thermostatic valve controlled thereby), within the cooling circuit 100', with operation identical to what has already been described.

As regards possible variants of the valve 1', the same considerations apply as those already expressed regarding the valve 1.

In particular, as has been anticipated, in alternative embodiments the electromagnet 8' may be replaced by a piezoelectric linear actuator or by a magnetostrictive linear actuator, both of which can be controlled electrically.

In the preferred embodiment represented in FIG. 7, the poppet 6' is countered in its movement along the axis X1' by a first elastic element and a second elastic element having stiffnesses preferentially different from one another. However, the two elastic elements 20', 32' may be sized so as to have identical stiffnesses, which, on the hypothesis of an electromagnet with linear behaviour, would enable amplitudes of current $I_2$ and $I_1$ to be obtained, one of which is twice the other.

Of course, it is possible to choose the stiffnesses in a different way; for example the stiffness of the element 20' may be greater than the stiffness of the element 32', or vice versa.

In other embodiments, it is possible to replace the ensemble of the two elastic elements with a single equivalent elastic element having a nonlinear characteristic. This would be equivalent to sizing the single elastic element so that a deformation thereof from the condition at rest equal to $\Delta h_1$ is characterized by a first value of stiffness to deformation, whilst a subsequent deformation of amplitude $\Delta h_1 - \Delta h_1$ is characterized by a stiffness to deformation greater than the first stiffness so as to reproduce equivalently the mechanical parallel of the elastic elements 20', 32' that characterizes the valve 1'.

As final consideration—which can be applied to all the embodiments 1, 100, 1'—it is possible to envisage more than one intermediate position. In other words, it is possible to provide the valve 1, 100, 1' as a two-way, three-position valve, where the (second) intermediate position is itself modulable, for example via actuation of the solenoid S, S' with an electrical ramp signal (similar to what is obtained—for example—in electrically actuated proportional valves). It is possible in this way to vary the degree of partialization of the section of passage between the ways 2 and 4 according to the requirements of the application of the valve 1, 1'. In the case described here, this would enable extremely precise control of the flow rate of coolant at input to the engine 102 as a function of the temperature of the coolant itself.

As further consideration, it should be noted that the embodiments of the valve according to the invention presented herein envisage providing a seal between the poppet and the valve seat of the cone/edge type (valve 1, 100: conical surface A20 on edge A10) or cone/cone type (valve 1': the surface A6' has conical geometry, the seat A13' also presents conical geometry). However, in other embodiments, it is possible to envisage a seal of the ball/cone type, where the spherical geometry would be assigned to the poppet.

What is claimed is:

1. An electrically actuated valve including:
   a first working way and a second working way and a poppet configured for providing a seal on a valve seat set hydraulically between the first working way and the second working way, the poppet including a first operating position, a second operating position, and a third operating position, and being displaceable by means of an electrical-actuation device,
   wherein:
      in the first operating position, a passage area for a hydraulic fluid defined between said valve seat and said poppet has a maximum value;
      in the second operating position, said passage area is partialized and has a value lower than said maximum value; and
      in the third operating position, said poppet is in contact with said valve seat and the passage area has a substantially zero value so that the first working way is isolated from the second working way,
   wherein:
      the poppet is displaceable from the first operating position to the second operating position by means of a first electrical command imparted to said electrical-actuation device against the resisting action of a first elastic element; and
      the poppet is displaceable from the second operating position to the third operating position by means of a second electrical command imparted to said electrical-actuation device against the resisting action of said first elastic element and of a second elastic element; and
      said poppet hydraulically balanced and including a head having a hollow cylindrical shape, and a shank integral with the head and having a diameter smaller than that of the head in such a way as to define a shoulder at an interface between said head and said shank, and
      the shoulder comprising a ring of through holes providing fluid communication between a cavity within the head of the poppet and an opposite side of the shoulder.

2. The valve according to claim 1, wherein said poppet is displaceable along a main axis of said valve and is coaxial thereto.

3. The valve according to claim 1, wherein said first elastic element and said second element have identical stiffnesses.

4. The valve according to claim 1, wherein said first elastic element and said second elastic element have different stiffnesses.

5. The valve according to claim 1, wherein:
in said first operating position of the poppet there is a first axial play between a first abutment surface of said poppet and a second abutment surface, exerted on which is the action of said second elastic element and a second axial play between said poppet and said valve seat, wherein said second axial play is greater than said first axial play;
in said second operating position of the poppet said first axial play is overridden; and
in said third operating position of the poppet also said second axial play is overridden.

6. The valve according to claim 5, wherein a moving element of said electrical-actuation device has a maximum axial travel chosen so as to be greater than the value of said second axial play.

7. The valve according to claim 1, including a sleeve having a cylindrical tubular shape, provided on which are said first working way and second working way and mounted axially movable within which is said poppet, wherein said electrical-actuation device is fixed to said sleeve.

8. The valve according to claim 7, wherein the head is slidably mounted within a first stretch of a through hole of said sleeve having a first diameter, and said shank traverses a second stretch of said through hole of said sleeve.

9. The valve according to claim 8, wherein housed in said second stretch of said axial hole of the sleeve are:
a first spacer ring abutting on a shoulder between said first stretch and said second stretch of the through hole; and
said second elastic element, abutting on said first spacer ring and upon an axially fixed elastic positioning ring.

10. The valve according to claim 9, further including a second spacer ring abutting on said elastic positioning ring and in turn having a contrast surface for an anchor of an electromagnet defining said electrical-actuation device, said anchor being axially constrained to said shank and being slidable in a cavity within which said first elastic element is housed, abutting on the shank.

11. The valve according to claim 7, wherein said sleeve includes a central through hole comprising:
a first stretch having a first diameter;
a second stretch having a second diameter; and
a third stretch having a third diameter,
said third diameter being smaller than the second diameter, which in turn is smaller than the first diameter so as to define a first shoulder and a second shoulder,
wherein said poppet has a generally tubular cylindrical shape and is slidably mounted within said axial through hole, guided by said second stretch.

12. The valve according to claim 11, wherein housed in said first stretch of said axial hole of the sleeve are:
a first spacer ring, set in abutment on said first shoulder;
a second spacer ring in abutment on the first spacer ring and having an internal diameter greater than the internal diameter of said first spacer ring; and
a third spacer ring in abutment on the second spacer ring and having an internal diameter smaller than the internal diameter of said second spacer ring,
said second elastic element having a first end in abutment on the third spacer ring and a second end in abutment on a bushing, provided on which is said valve seat.

13. The valve according to claim 12, wherein said first elastic element is set with a first end abutting on a shoulder of an axial hole provided in said poppet and a second end abutting on a hub of said bushing, wherein moreover a retaining ring is fixed thereto and axially movable in a region comprised between said first spacer ring and said third spacer ring.

14. The valve according to claim 1, wherein said electrical-actuation device includes, alternatively, an electromagnet, a piezoelectric linear actuator, or a magnetostrictive linear actuator.

* * * * *